US009648074B2

(12) United States Patent
Liu

(10) Patent No.: US 9,648,074 B2
(45) Date of Patent: May 9, 2017

(54) SYSTEMS AND METHODS FOR DELIVERING MEDIA DATA BASED ON GEOGRAPHICAL LOCATIONS

(71) Applicant: Tencent Technology (Shenzhen) Company Limited, Shenzhen (CN)

(72) Inventor: Jing Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 432 days.

(21) Appl. No.: 14/164,073

(22) Filed: Jan. 24, 2014

(65) Prior Publication Data

US 2014/0359078 A1    Dec. 4, 2014

(30) Foreign Application Priority Data

May 31, 2013  (CN) .......................... 2013 1 0213408

(51) Int. Cl.
*G06Q 30/02*  (2012.01)
*G06F 17/30*  (2006.01)
(Continued)

(52) U.S. Cl.
CPC ........ *H04L 65/80* (2013.01); *G06F 17/30867* (2013.01); *G06Q 30/02* (2013.01);
(Continued)

(58) Field of Classification Search
CPC .... H04L 65/80; H04L 67/10–67/2847; H04W 4/02–4/023;
(Continued)

(56) References Cited

U.S. PATENT DOCUMENTS 8,949,871 B2 * 2/2015 Chai ...................... H04H 60/45
                                                        725/10
9,210,028 B1 * 12/2015 Pinson ................ H04L 65/4084
(Continued)

FOREIGN PATENT DOCUMENTS

CN      101346974 A    1/2009
CN      101517563 A    8/2009
(Continued)

OTHER PUBLICATIONS

Tencent Technology, ISRWO, PCT/CN2013/090052, Mar. 6, 2014, 7 pgs.

(Continued)

*Primary Examiner* — Wing F Chan
*Assistant Examiner* — Raji Krishnan
(74) *Attorney, Agent, or Firm* — Morgan, Lewis & Bockius LLP

(57) ABSTRACT

The invention discloses a method performed at a server computer for location-based media data delivering. The method includes receiving first geolocation data that identify a first geolocation of a first client device, identifying a plurality of second client devices as located within a predetermined range of the first geolocation according to their respective second geolocation data, and in response to the identifying, retrieving media file log data that record information concerning a plurality of media files that have been transmitted to the plurality of second client devices. The method further includes in response to a media content request received from the first client device for requesting interested media data: identifying, among the retrieved media file log data, one or more media files as being associated with the interested media data, and transmitting information of at least one identified media file and the interested media data to the first client device.

18 Claims, 8 Drawing Sheets

(51) Int. Cl.
*H04L 29/06* (2006.01)
*H04L 29/08* (2006.01)
*H04W 4/02* (2009.01)

(52) U.S. Cl.
CPC .......... *H04L 65/4084* (2013.01); *H04L 67/10* (2013.01); *H04W 4/023* (2013.01); *H04L 67/02* (2013.01); *H04L 67/22* (2013.01)

(58) Field of Classification Search
CPC .. G06Q 30/02–30/0214; G06Q 10/10–10/107; G06F 17/2235–17/30893; H04N 1/00204–1/00244
See application file for complete search history.

(56) References Cited

U.S. PATENT DOCUMENTS

| | | | | |
|---|---|---|---|---|
| 9,367,281 | B2* | 6/2016 | Hosein | H04M 1/72519 |
| 2007/0093258 | A1* | 4/2007 | Steenstra | H04W 4/02 |
| | | | | 455/456.5 |
| 2008/0065505 | A1* | 3/2008 | Plastina | G06Q 30/02 |
| | | | | 705/27.1 |
| 2008/0222106 | A1* | 9/2008 | Rao | G06F 17/30696 |
| 2008/0222655 | A1* | 9/2008 | Sato | H04N 1/00204 |
| | | | | 719/318 |
| 2011/0231778 | A1* | 9/2011 | Hoag | G06F 17/30867 |
| | | | | 715/745 |
| 2011/0256881 | A1* | 10/2011 | Huang | G01S 5/0257 |
| | | | | 455/456.1 |
| 2012/0117151 | A1* | 5/2012 | Bill | G06Q 10/10 |
| | | | | 709/204 |
| 2012/0254910 | A1* | 10/2012 | Donoghue | H04H 60/31 |
| | | | | 725/14 |
| 2012/0290648 | A1* | 11/2012 | Sharkey | G06F 17/30053 |
| | | | | 709/204 |
| 2014/0032635 | A1* | 1/2014 | Pimmel | H04N 21/4126 |
| | | | | 709/203 |
| 2014/0278860 | A1* | 9/2014 | Lee | G06Q 30/0214 |
| | | | | 705/14.16 |
| 2015/0195675 | A1* | 7/2015 | Larkin | H04W 4/02 |
| | | | | 455/456.3 |
| 2016/0275579 | A1* | 9/2016 | Pike | G06Q 30/0641 |

FOREIGN PATENT DOCUMENTS

| | | |
|---|---|---|
| CN | 101645154 A | 2/2010 |
| CN | 102831524 A | 12/2012 |

OTHER PUBLICATIONS

Tencent Technology, IPRP, PCT/CN2013/090052, Dec. 1, 2015, 5 pgs.

\* cited by examiner

200

SYSTEMS AND METHODS FOR DELIVERING MEDIA DATA BASED ON GEOGRAPHICAL LOCATIONS

RELATED APPLICATIONS

This application is a continuation application of PCT Patent Application No. PCT/CN2013/090052, entitled "SYSTEMS AND METHODS FOR DELIVERING MEDIA DATA BASED ON GEOGRAPHICAL LOCATIONS" filed Dec. 20, 2013, which claims priority to Chinese Patent Application No. 201310213408.2, entitled "METHOD FOR PUSHING MEDIA FILE, METHOD, APPARATUS AND SYSTEM FOR RECEIVING MEDIA FILE," filed May 31, 2013, respectively, all of which are incorporated by reference in their entirety.

FIELD OF THE INVENTION

The present application relates to data communication technology, and in particular, to methods, systems and devices for determining information concerning a media file that is transmitted to a client device in response to a media content request issued by the client device.

BACKGROUND OF THE INVENTION

Recent technology innovations have allowed the public to conveniently receive media content in digital formats via wireless or wired communication networks. Media service providers provide information concerning available media content (e.g., audio or video files) on a user interface sustained at a client device, and allow a user to subscribe desirable media content according to the provided information based on his or her unique demands. However, the provided information concerning the available media content is normally identical to all users of each media service provider. For example, on the user interface at the client end, the same list of media files is displayed for a media category for all the subscribers to choose from.

Some media service providers endeavor to offer more relevant and individualized information concerning the available media content to each user. However, they merely change the relevant information in accordance with media files that are previously requested by the same user. Interests and tastes of each user are analyzed based on the requested media files, and the media service providers are able to move some media files that the respective user is interested in towards the head of the media file list. Nevertheless, given that a huge amount of media content is involved, such a presentation of the information concerning available media content is not always efficient, and may be substantially limited in its scope.

Similarly, when the media content is delivered with integrated advertisements, the embedded advertisement information is normally identical for all viewers of a specific media file, or merely adjustable according to a record of the media files requested by a specific viewer. As such, advertisements are not efficiently delivered, and substantially limited in their scope. Therefore, there is a need for data communication technology that could proactively predict user preferences beyond the existing scope of a user's own behaviors and provide media content and information concerning the media content in anticipation of the user's potential interests, ultimately improving corresponding user experience for the users or subscribers of the media content services.

SUMMARY

The above deficiencies and other problems associated with the conventional approaches of delivering interested media data to a client device are reduced or eliminated by the invention disclosed below. In some embodiments, the invention is implemented in a server computer that has one or more processors, memory and one or more modules, programs or sets of instructions stored in the memory for performing multiple functions. Instructions for performing these functions may be included in a computer program product configured for execution by one or more processors.

One aspect of the invention is a computer-implemented method for location based media data delivery. The method includes, at server computer having one or more processors and memory for storing programs to be executed by the one or more processors, receiving from a first client device first geolocation data that identify a first geographical location (geolocation) of the first client device. The method further includes identifying a plurality of second client devices according to respective second geolocation data received from each of the plurality of second client devices, wherein each second client device is identified as located within a predetermined range of the first geolocation; and in response to the identifying, retrieving media file log data that record information concerning a plurality of media files that have been transmitted to the plurality of second client devices. The method further includes in response to a media content request received from the first client device for requesting interested media data: identifying, among the retrieved media file log data, one or more media files as being related to the interested media data associated with the media content request, and transmitting information of at least one identified media file and the interested media data associated with the media content request to the first client device.

Another aspect of the invention is a server computer that includes one or more processors and memory having instructions stored thereon, which when executed by the one or more processors cause the processors to perform operations to receive from a first client device first geolocation data that identify a first geolocation of the first client device. The processors in the client device further perform operations to identify a plurality of second client devices according to respective second geolocation data received from each of the plurality of second client devices, wherein each second client device is identified as located within a predetermined range of the first geolocation; and in response to the identifying, retrieve media file log data that records information concerning a plurality of media files that have been transmitted to the plurality of second client devices. The processors in the client device further perform operations to in response to a media content request received from the first client device for requesting interested media data: identify, among the retrieved media file log data, one or more media files as being related to the media file associated with the media content request, and transmit information of at least one identified media file and the interested media data associated with the media content request to the first client device.

Another aspect of the invention is another computer-implemented method for location based media data delivering. The method includes, at server computer having one or more processors and memory for storing programs to be executed by the one or more processors, receiving from a first client device first geolocation data that identify a first geolocation of the first client device. The method further includes identifying a plurality of second client devices according to respective second geolocation data received from each of the plurality of second client devices, wherein each second client device is identified as located within a predetermined range of the first geolocation; and in response to the identifying, retrieving media file log data that record information concerning a plurality of media files that have been transmitted to the plurality of second client devices. The method further includes customizing content of a specific media file according to one or more media files that are related to the specific media file and included in the retrieved media file log data, and in response to a media content request received from the first client device for accessing a media file, transmitting the specific media file that includes the customized content to the first client device.

Another aspect of the invention is a non-transitory computer-readable medium, having instructions stored thereon, which when executed by one or more processors cause the processors to perform operations to receive from a first client device first geolocation data that identify a first geolocation of the first client device. The processors in the client device further perform operations to identify a plurality of second client devices according to respective second geolocation data received from each of the plurality of second client devices, wherein each second client device is identified as located within a predetermined range of the first geolocation; and in response to the identifying, retrieve media file log data that records information concerning a plurality of media files that have been transmitted to the plurality of second client devices. The processors in the client device further perform operations to customize content of a specific media file according to one or more media files that are related to the specific media file and included in the retrieved media file log data, and in response to a media content request received from the first client device for accessing a media file, transmit the specific media file that includes the customized content to the first client device.

Other embodiments and advantages may be apparent to those skilled in the art in light of the descriptions and drawings in this specification.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
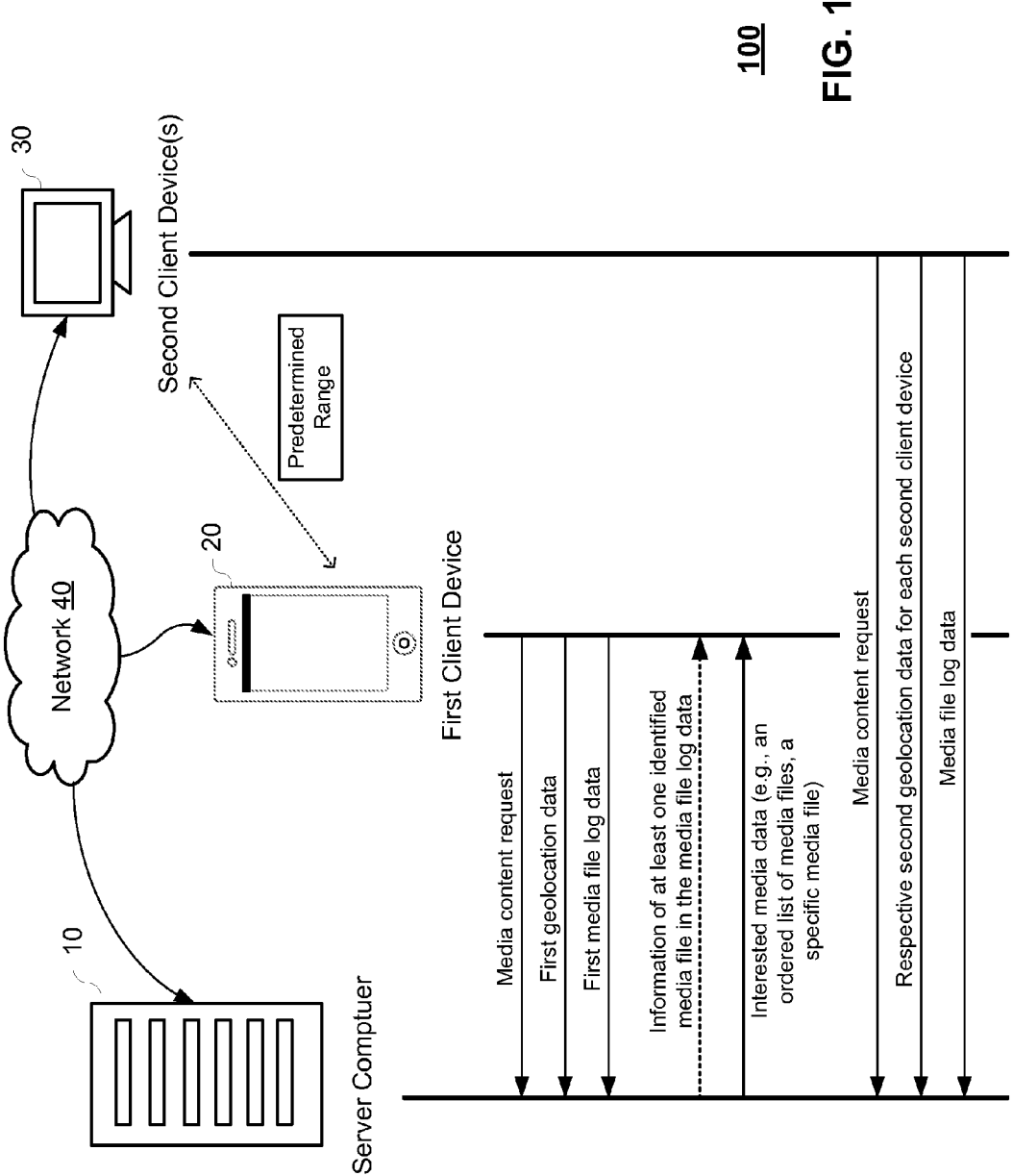
FIG. 1 illustrates exemplary data communication processes implemented in a data communication system according to some embodiments in the invention.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Description of each embodiment in the following is made with reference to the accompanying drawings, so as to exemplify specific embodiments capable of being implemented in the present application. Direction words mentioned in the present application, for example, "upper", "lower", "front", "back", "left", "right", "inner", "outer", and "side surface" only refer to directions of the accompanying drawings. Therefore, the used direction words are used to illustrate and understand the present application, instead of limiting the present application. In the drawings, units with a similar structure may be represented by the same numeral.

FIG. 1 illustrates exemplary data communication processes 100 implemented in a data communication system according to some embodiments in the invention. The data communication system includes server computer 10 and a plurality of client devices, including first client device 20 and one or more second client devices 30. Server computer 10, first client device 20 and second client devices 30 are communicatively coupled to each other via communication network 40. In accordance with data communication processes 100, server computer 10 responds to a media content request by delivering data (e.g., information concerning at least one identified media file in media file log data and interested media data) to first client device 20 based on relative geographical locations (geolocations) between the first and second client devices.

In some implementations, the interested media data are selected from an ordered list of media files, a specific media file and a media file with customized media content. In some embodiments, the ordered list of media files includes a list of media files, and is requested by a user of first client device 20 for further reviewing. The media files in the ordered list and the order of the media files are determined according to the at least one identified media file in the media file log data associated with second client devices 30. In some embodiments, a specific media file is determined according to the at least one identified media file in the media file log data associated with second client devices 30, and directly delivered to first client device 20. In some embodiments, a media file is selected based on the at least one identified media file log data, and additionally, the content of the media file is customized to include extra content, such as advertisement clips, that is also optionally determined by the at least one identified media file log data.

Communication network 40 that support communication among server computer 10, first client device 20 and second client devices 30 can be one or more networks having one or more type of topologies including but not limited to the Internet, intranets, local area networks (LANs), cellular networks, Ethernet, Storage Area Networks (SANs), telephone networks, Bluetooth personal area networks (PAN) and the like. In some embodiments, first client device 20 is coupled to server computer 10 via a wired connection, while second client devices 30 are coupled to server computer 10 via LANs.

In various embodiments of the invention, server computer 10 can receive a media content request, first geolocation data and first media file log data from first client device 20. The media content request is issued by first client device 20 to request the interested media data that are controlled by server computer 10. The first media file log data track information concerning a plurality of media files that have been transmitted to first client device 20. The first geolocation data identify at least a first geolocation of first client device 20. In some embodiment, the first geolocation data include current geolocation data associated with a current geolocation where first client device 20 is currently located, while in some embodiments, the first geolocation data include historical geolocation data that track where first client device 20 was previously located during a predetermined duration of time. Thus, the first geolocation is a reference geolocation that is optionally the current geolocation or one of the previous geolocation of first client device 20.

In some circumstances, the media content request, the first geolocation data and the first media file log data are communicated from first client device 20 to server computer 10 together in one communication session; however, in other circumstances, they are communicated to server computer 10 independently in different communication sessions. In one specific example, the media content request is sent by first client device 20 as needed, independently of the first geolocation data and the first media file log data. On the other hand, the media file log data are sent when new media files are loaded at first client devices 20, and the first geolocation data are regularly updated to server computer 10. Under some circumstances, first client device 20 merely provides and updates its media file log data and geolocation data to server computer 10, when first client device 20 issues a new media content request for receiving the corresponding interested media data maintained by server computer 10.

Similarly, in various embodiments of the invention, server computer 10 can also receive a respective media content request, respective second geolocation data and respective media file log data from each of client device 30. The respective media content request is issued to request the respective interested media data, and the respective media file log data record information concerning a plurality of media files that have been transmitted to each second client device 30. The respective geolocation data received from each of second client devices 30 further include current geolocation data that identify where respective second client device 30 is currently located, and historical geolocation data that identify where respective second client device 30 was previously located during a predetermined duration of time.

Additionally, the respective media content request, respective second geolocation data and respective media file log data are also optionally communicated from second client device 30 to server computer together in one communication session or separately in different communication sessions. Similarly, in one specific example, the respective media content request is sent by second client device 30 as needed, the respective media file log data are sent when new media files are loaded at second client devices 30, and however, the respective second geolocation data are regularly updated to server computer 10. Under some circumstances, second client device 30 provided and updated its media file log data and geolocation data to server computer 10, when second client device 30 previously sent a media content request for requesting the respective interested media data maintained by server computer 10.

In some embodiments, first client device 20 and each second client device 30 independently manages issuing of their respective media content requests, and updating of their respective geolocation and media file log data. In some embodiments, server computer 10 manages updating of the respective geolocation and media file log data in a centralized manner.

In some implementations, in response to the media content request received from first client device 20, server computer 10 returns to first client device 20 at least one identified media file in the media file log data received from second client devices 30, and the requested interested media data. Upon receiving such information, first client device 20 may customize the interested media data to take into account behaviors and interests of users of second client devices 30 based on the at least one identified media file in the media file log data received from second client devices 30. In particular, such second client devices 30 are selected based on their second geolocation data in view of the first geolocation of first client device 20.

It is noted that the first geolocation functions as a reference location to identify second client devices 30. In some situations, the first geolocation is where first client device 20 is currently located, while in other situations, the first geolocation is where first client device 20 was previously located at a previous instant. The respective second geolocation data optionally identify a current location or a previous location of corresponding second client device 230. Second client devices 30 are identified when the current or previous location of second client device 30 is or was located within a predetermined range of the first geolocation of first client device 20. Accordingly, the requested specific media file is customized according to the media file log data of the selected second client devices 30.

From another perspective, users of second client devices 30 constitute a small group of interested users who share a common activity region with the user of first client device 20. This is so because second client devices 30 are presently located nearby the current location of first client device 20, previously located nearby the current location of first client device 20, currently located nearby a previous location that first client device 20 once visited, or previously located nearby a previous location that first client device 20 once visited.

In some implementations, the user of first client device 20 optionally determines first criteria for selecting the first geolocation (or the reference location) and second criteria for identifying second client devices 30 in a user interface of a web browser installed on first client device 20. However, in some implementations, server computer 10 proactively determines both criteria for first client device 20, and thereafter, analyzes the received geolocation data and media file log data based on the determined criteria.

As discussed in the Background, many existing solutions adopt a media data delivery technique that is merely based on the first client device's own media exploring activities. In contrast, various embodiments in the invention take advantage of feedback from other client devices located within a certain physical range of a request client device. Thus, the interested media data delivered to the request client device is richer, and more relevant to the user's demand on the request client device.

Figure 2A:
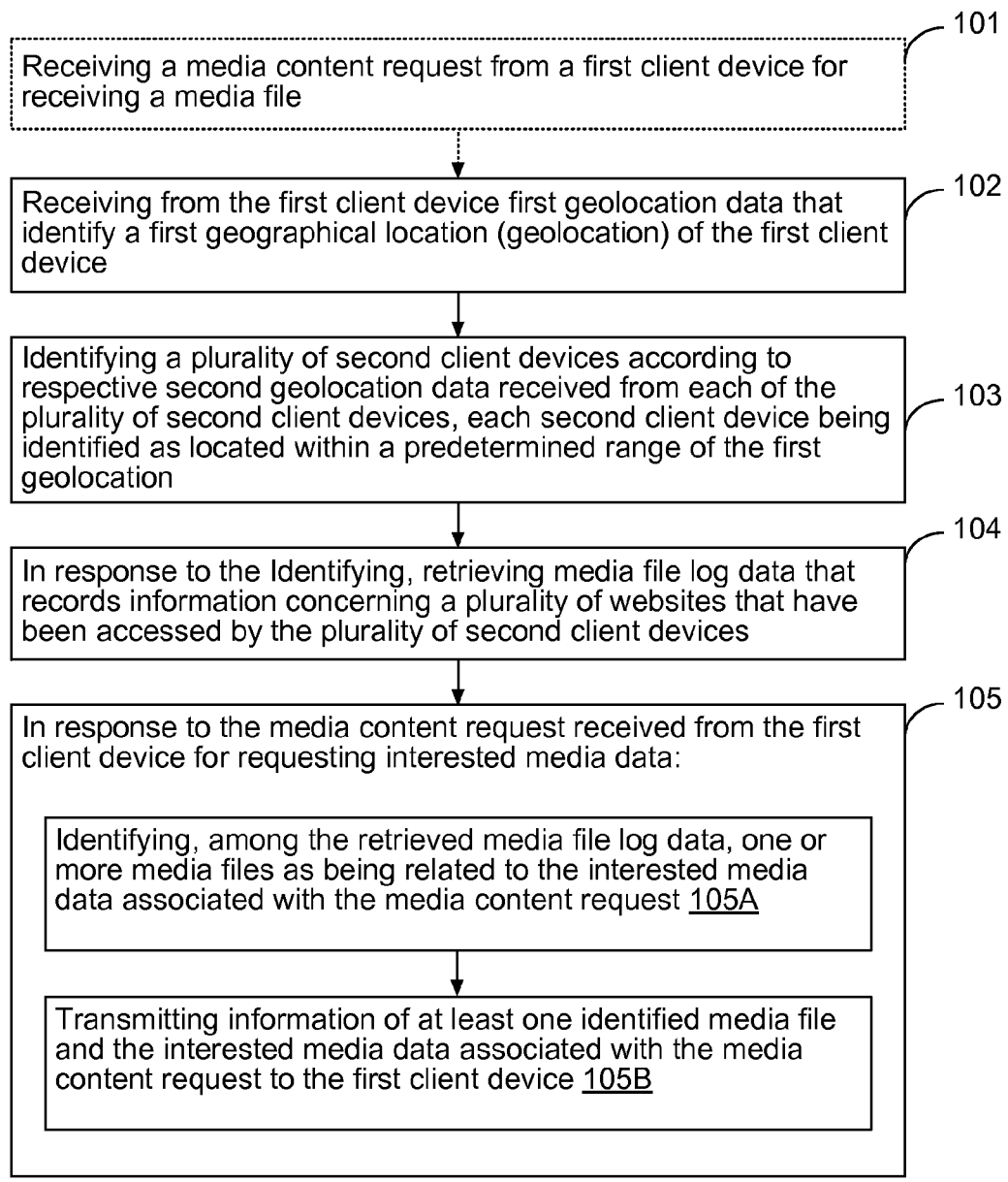
FIG. 2A illustrates a flow chart for an exemplary method that is implemented at a server computer to deliver location based media data according to some embodiments in the invention.

FIG. 2A illustrates a flow chart for an exemplary method 200 that is implemented at a server computer to deliver location based media data according to some embodiments in the invention. In particular, method 200 is performed to provide location based media data to first client device 20 that requests interested media data from server computer 10. Method 200 is, optionally, governed by instructions that are stored in a non-transitory computer readable storage medium and that are executed by one or more processors of a client device. Each of the operations shown in FIG. 2A may correspond to programs or instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

Method 200 includes receiving (101) a media content request from first client device 20 for requesting interested media file. In addition, server computer 10 receives (102) from first client device 20 first geolocation data that identify at least a first geographical location (geolocation) of first client device 20. In accordance with the first geolocation of first client device 20, server computer 10 further identifies (103) a plurality of second client devices according to respective second geolocation data received from each of the plurality of second client devices. Each identified second client device is identified as located within a predetermined range of the first geolocation of first client device 20.

Each client device is optionally a personal computer that is fixed at a venue, or a mobile client device (e.g., a notebook computer, a mobile phone and a tablet computer) that is carried by a user of the corresponding client device. Optionally, first and second geolocation data include the respective latitude, longitude and elevation for the first and second client devices, respectively. Optionally, first and second geolocation data include Internet Protocol (IP) addresses of the first and second client devices, respectively. In some implementations, when the first or second client devices are mobile devices, they could rely on an embedded Location Based Service (LBS) (e.g., a Global Position System (GPS) function) to obtain their respective geolocation data. In one example, the respective geolocations of a client device are identified as its relative position with respect to base stations in a cellular network. In other implementations, server computer 10 determines the geolocation of first client device 20 based on the corresponding IP address of the first client device 20.

In some implementations, the predetermined range within which second client devices 30 are identified with respect to the first geolocation of first client device 20 is defined by default. However, in other implementations, the predetermined range is modified to a preferred range by a user of first client device 20 so as to cover a venue where the user of first client device 20 is currently or was previously located. In some specific examples, the predetermined range is set as a distance of 100 meters, 500 meters or 1 kilometer. In some embodiments, the predetermined range covers a venue that is selected from a group consisting of a school, a store, a company site, a library, a hotel and a residence.

In some implementations, the predetermined range with respect to the first geolocation is set at a relatively large value, and covers a wide area surrounding this first geolocation where first client device 20 is currently or was previously located. Thus, second client devices 30 can be selected according to the venues where their users visited or are currently located, even when such venues are not close to the first geolocation. As one specific example, first and second geolocation data indicate that first and second client devices 30 are associated together by two correlated venues which have similar functions, such as two high schools and two libraries.

In response to the identifying (103), server computer 10 further retrieves (104) media file log data that records information concerning a plurality of media files that have been transmitted to second client devices 30. When each client device (e.g., first client device 20 and second client device 30) requests the interested media data online, the corresponding media data are provided by a certain resource server (e.g., server computer 10) via communication network 40. In many embodiments, the respective client device identifies the interested media data by providing a corresponding Uniform Resource Locator (URL) address or a name of a media source. Upon receiving or browsing a media file, the respective client device updates a browsing record of the requested media files to include corresponding media file log data (e.g., the URL address or information concerning the media source). In some embodiments, a web browser or a media player in the respective client device stores the media file log data locally, such that the browsed media file may be reloaded quickly based on the stored media file log data in response to another media content request to the same media file. Thus, in some embodiments, the media file log data for each second client device 30 include information concerning media sources and content of each of the media files that have been transmitted to second client devices 30 during a predetermined duration of time.

In some embodiments, content of a media file includes images, audio clips, and video clips. In accordance with the media file content, the information concerning the media sources and the content of the media file content includes, but is not limited to, content provider information, textual information, hyperlinks, and many other types of related information. In some embodiments, the information concerning the media sources and the content further includes information about corresponding behavior patterns and interests of a user of the respective client device, which are derived based on the specific media files that are transmitted to the user.

After retrieving the media file log data, server computer 10 responds (105) to the media content request received from first client device 20 by identifying (105A), among the retrieved media file log data, one or more media files as being related to the interested media data associated with the media content request; and transmitting (105B) information of at least one identified media file and the interested media data associated with the media content request to the first client device. Then, when first client device 20 receives the information of the at least one identified media file and the interested media data, first client device 20 loads an ordered list of media files, a specific media file, or a media file with customized content each of which is based on the information of at least one identified media file originally included in the media file data log of one or more second client devices 30. Therefore, by setting a proper designated range, server computer 10 enables client devices that are located at or visited nearby the first geolocation to share their media file log data, and customizes the interested media data for one of these client devices according to the browsing habits of the users of the other client devices.

In many implementations, each media file associated with the interested media data is selected from a static image, a video clip, an audio clip and a live broadcast (including a conference or a television program). In some specific examples, users located within a predetermined range of the first geolocation of first client device 20 are mainly high school students sharing similar interests and tastes in clothing, books and media content. When first client device 20 requests music video clips related to a specific artist, server computer 10 sponsored by a media content provider therefore delivers media file log data of one or more nearby second client devices 30 together with the interested media data. The interested media data is customized accordingly to present a list of the artist's music video clips, and this list is ordered based on specific information (e.g., the popularity of the included video clips among the users of second client devices 30) that is derived from the media file log data of corresponding second client devices 30.

In other specific examples, when the media content request requests a specific media file, advertisement clips are embedded in and loaded together with the requested media file. The advertisement clips are selected according to the behavior patterns and interests of other users that are located at the first geolocation or visited nearby locations, and thereby present more trendy and customer-oriented product information to the user of the corresponding client device.

It should be understood that the particular order in which the operations in FIG. 2A have been described are merely exemplary and are not intended to indicate that the described order is the only order in which the operations could be performed. Specifically, operation 101 of receiving the media content request may be implemented before or after any of operations 102-104, except that it has to be completed before operation 15 which responds to the media content request. Additionally, it should be noted that details of other processes described herein with respect to methods 250, 300, 400 and 500 (e.g., FIGS. 2B, 3, 4 and 5) are also applicable in an analogous manner to method 200 described above with respect to FIG. 2A. For brevity, these details are not repeated here.

Figure 2B:
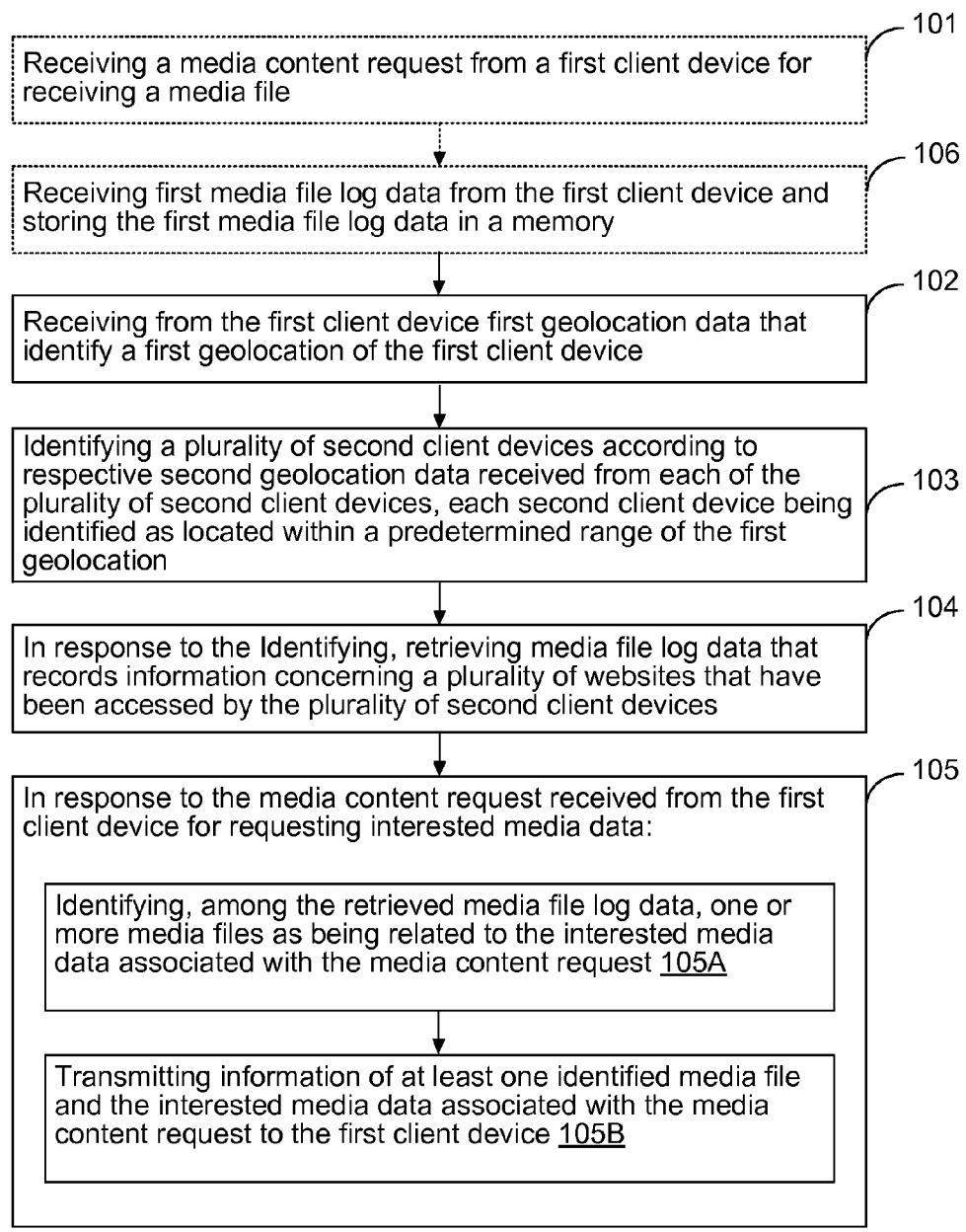
FIG. 2B illustrates a flow chart for another exemplary method that is implemented at a server computer to deliver location based media data according to some embodiments in the invention.

FIG. 2B illustrates a flow chart for another exemplary method 250 that is implemented at a server computer to deliver location based media data according to some embodiments in the invention. Here, method 250 is also performed by server computer 10 to provide location based media data to first client device 20. On basis of method 200, in addition to operations 101-105, server computer 10 also receives (106) first media file log data from first client device 20 and stores (106) the first media file log data in the memory.

It should be understood that the particular order in which the operations in FIG. 2B have been described are merely exemplary and are not intended to indicate that the described order is the only order in which the operations could be performed. Therefore, in various embodiments, operation 106 of receiving and storing the first media file log data may be implemented according to a different order of the sequence of operations in method 250. In some implementations, the first media file log data are received from first client device 20 when the media content request is received from first client device 20, just as the media file log data for second client devices 30 were previously received and stored in the memory of server computer 10, when server computer 10 received respective media content requests issued by corresponding second client devices 30. In some implementations, the first media file log data are received from first client device 20 when the first geolocation data are received from first client device 20. The first media file log data are therefore stored on server computer 10, and may be used to respond to a media content request from another client device based on location based media data delivery as described herein for first client device 20.

In some implementations, server computer 10 tracks and updates the first geolocation data, the respective geolocation data received from each second client device 30, the first media file location data, and the media file log data for second client devices 30, before first client device 20 sends the media content request. In some implements, such tracking and updating operations are maintained regularly at a specific frequency (e.g., every one hour) to keep track of all or some selected client devices associated with server computer 10. However, in some implementations, such tracking and updating operations for a certain client device occur when server computer 10 receives from the client device a media content request or corresponding interested media data.

Figure 3:
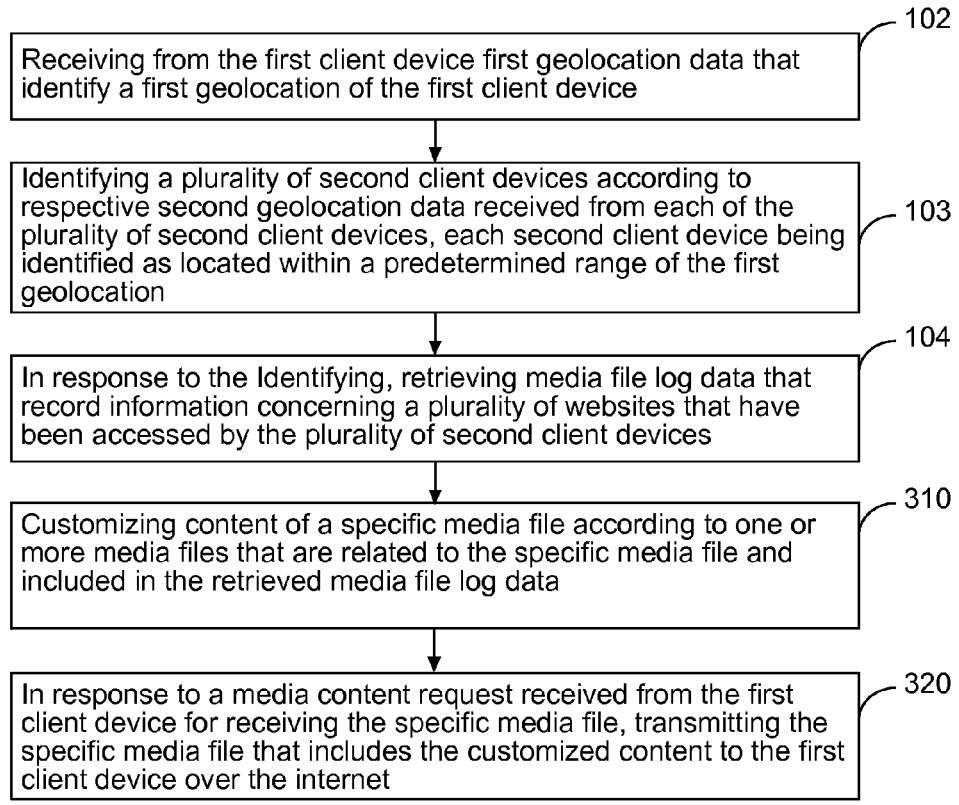
FIG. 3 illustrates a flow chart for an exemplary method that is implemented at a server computer to deliver location based media content to a client device according to some embodiments in the invention.

FIG. 3 illustrates a flow chart for an exemplary method that is implemented at a server computer to deliver location based media content to a client device according to some embodiments in the invention. Method 300 is performed to provide location based media content to first client device 20 that requests a specific media file from server computer 10. Unlike methods 200 and 250, method 300 relies on server computer 10 to customize content of the specific media file requested by first client device 20 based on media file log data for second client devices 30. The raw data in the media file log data received from second client devices 30 are securely retained at said server computer 10 without being leaked to the other client devices.

Method 300 is, optionally, governed by instructions that are stored in a non-transitory computer readable storage medium and that are executed by one or more processors of a client device. Each of the operations shown in FIG. 3 may correspond to programs or instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

In method 300, server computer 10 receives (102) from first client device 20 first geolocation data that identify at least a first geolocation of first client device 20. Server computer 10 then identifies (103) a plurality of second client devices 30 according to respective second geolocation data received from each second client device, and each of such identified second client devices 30 is identified as previously or currently located within a predetermined range of the first geolocation of first client device 20. In response to the identifying, server computer 10 retrieves (104) media file log data that record information concerning a plurality of media files that have been transmitted to the plurality of second client devices 30. Server computer 10 further customizes (310) content of a specific media file according to one or more media files that are related to the specific media file and included in the retrieved media file log data. Then, in response to a media content request received from first client device 20 for receiving the specific media file, server computer 10 transmits (320) the specific media file that includes the customized content to first client device. In some embodiments, server computer 10 also receives first media file log data from first client device 20 and stores the first media file log data in its memory.

In some embodiments, the respective geolocation data and media file log data for each of first client device 20 or second client device 30 are updated and stored in the memory of server computer 10, when server computer 10 receives a media content request from the corresponding client device. However, in some embodiments, the geolocation data and media file log data for each of the first and second client devices are received and updated regularly from the respective client device, independently of receiving the media content request. The respective geolocation data include current geolocation data and historical geolocation data that identify the current and previous locations of the corresponding client device, respectively. Additionally, the media file log data for the respective client device track information concerning a plurality of media files that have been transmitted to the respective client device. In some implementations, the media file log data for the respective client device further include information about corresponding behavior patterns and interests of a user of the respective client device, which are derived based on the specific media files that are transmitted to the user.

More details on the geolocation data and the media file log data for each client device are explained above with reference to FIGS. 1, 2A and 2B. In addition, a predetermined range with regard to the first geolocation of first client device 20 is applied to identify second client devices 30 based on the geolocation data of the first and second client devices, and more details on the predetermined range are also explained above with reference to FIGS. 1, 2A and 2B.

Under many circumstances, the customized content of the requested media file is selected from images, product information, sales, sales tips, news clips, and advertisements. For corresponding examples, see FIGS. 2A and 2B and the description above of these figures.

It is noted that in method 300, the media file log data for second client devices 30 are preferably retained at server computer 10 without being transmitted together with the specific media file to first client device 20. Therefore, under many circumstances, the customized content of the specific media file is determined at server computer 10 without sharing the media file log data with first client device 20 or compromising privacy of second client devices 30.

It should be understood that the particular order in which the operations in FIG. 3 have been described are merely exemplary and are not intended to indicate that the described order is the only order in which the operations could be performed. One of ordinary skill in the art would recognize various ways to delivering media file content based on device locations as described herein. Additionally, it should be noted that details of other processes described herein with respect to methods 200, 250, 400 and 500 (e.g., FIGS. 2A, 2B, 4 and 5) are also applicable in an analogous manner to method 300 described above with respect to FIG. 3. For brevity, these details are not repeated here.

Figure 4:
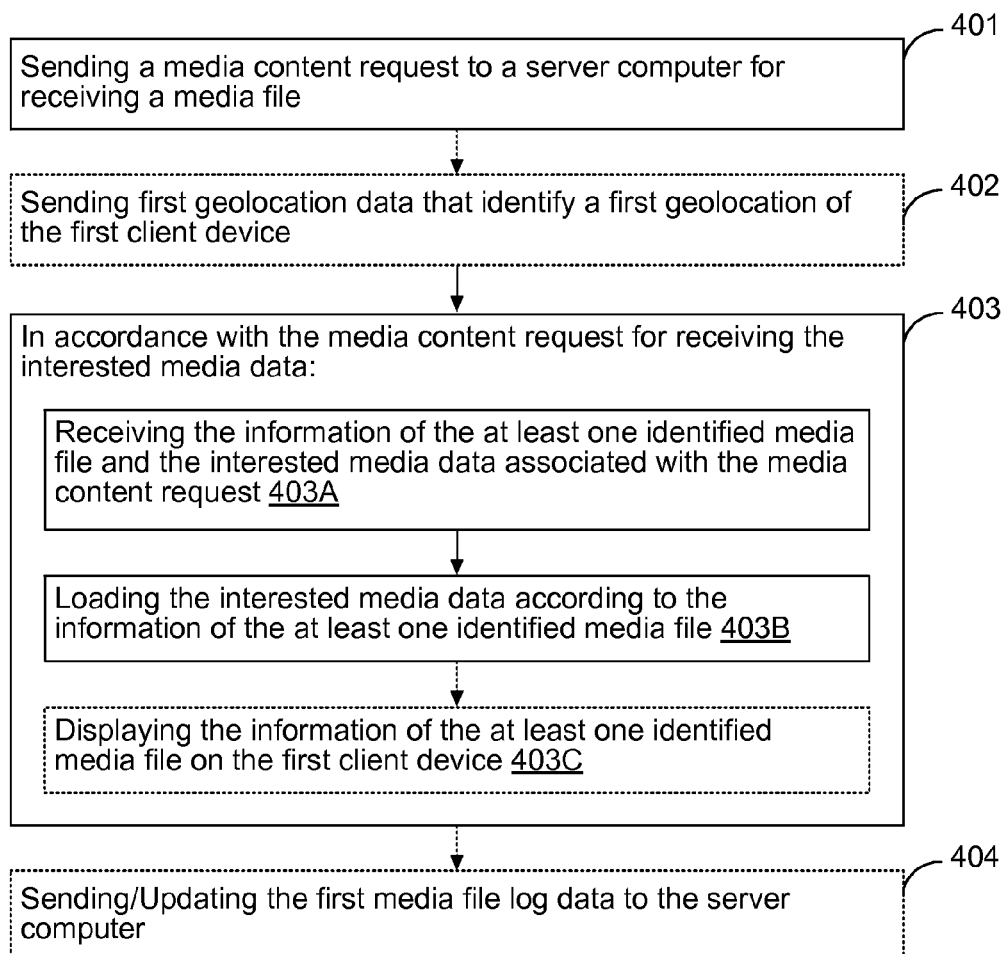
FIG. 4 illustrates a flow chart for an exemplary method that is implemented at a client device to process location based media data according to some embodiments in the invention.

FIG. 4 illustrates a flow chart for an exemplary method that is implemented at a client device to process location based media data according to some embodiments in the invention. In some specific implementations, the location based media data are associated with an ordered list of media files, a specific media file, or selected content of a specific media file each of which is requested by the client device (e.g., first client device 20 as illustrated in FIG. 1). Method 400 is, optionally, governed by instructions that are stored in a non-transitory computer readable storage medium and that are executed by one or more processors of a client device. Each of the operations shown in FIG. 4 may correspond to programs or instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 400 may be combined and/or the order of some operations may be changed.

In some embodiments, first client device 20 sends (401) a media content request to server computer 10 to request access to interested media data that optionally include an ordered list, a specific media file or a media file integrated with customized content. In accordance with (403) the media content request for accessing the media file, first client device 20 receives (403A) from server computer 10 information of at least one identified media file and the interested media data associated with the media content request. The at least one identified media file is associated with at least one second client device 30 that has been determined by server computer 10 as a device currently or previously located with a predetermined range of the first geolocation of first client device 20. For brevity, the details are not repeated here with respect to corresponding operations to identify the at least one identified media file in the media file log data for second client devices 30 at server computer 10.

Subsequently after receiving the information of the at least one identified media file and the requested media file, first client device 20 loads (403B) the interested media data according to the information of the at least one identified media file. In some implementations, the interested media data includes a specific media file. The specific media file is selected based on the information of the at least one identified media file, or content of the media file is optionally customized based on the information of the at least one identified media file, before the media file is loaded at first client device 20. In other implementations, the interested media data includes an ordered list of media file, the media files included in the list and their positions in the ordered list are determined according to the information of the at least one identified media file.

In some embodiments, first client device 20 further displays (403C) the information of the at least one identified media file on first client device 20. In one example, the at least one identified media file includes multiple media files, and such information is displayed in a format of list or table to facilitate further research by the user of first client device 20. Optionally, the user of first client device 20 sets display parameters, e.g., number of media files displayed on one screen, on a certain user interface. Optionally, the user selects a display format as successive pages or drop-down menus.

Alternatively, in some implementations not reflected in FIG. 4, in accordance with the media content request, first client device 20 receives (403A) the requested media file that includes customized content from server computer 10. The information of the at least one identified media file is retained at server computer 10, because content customization of the requested media file has been completed on server computer 10. After receiving the requested media data, first client device 20 again loads (403B) the media file including the customized content on first client device 20.

As explained above, first client device 20 may be a fixed client device (e.g., a desktop computer) or a mobile client device (e.g., a notebook computer, a mobile phone and a tablet personal computer). In some embodiments, first client device 20 determines its own geolocation (e.g., first geolocation), and sends (402) corresponding first geolocation data to server computer 10. In this circumstance, first client device 20 applies its embedded LBS function or specifically a GPS function to determine the first geolocation data of first client device 20, and reports such first geolocation data to server computer 10. In some embodiments, the first geolocation data of first client device 20 are optionally determined according to an IP address of first client device by server computer 10.

Method 400 further includes (404) sending and/or updating first media file log data to server computer 10. In some embodiments, the first geolocation data are regularly sent and updated to server computer 10, and however, in other embodiments, the first geolocation data are updated together with the media content request, when the media content request is sent to server computer 10. More details on the format of the first geolocation data are explained above with reference to FIGS. 1, 2A and 2B.

Under many circumstances, first client device 20 retains media file log data (e.g., first media file log data) that track a plurality of media files that have been transmitted to itself during a certain duration of time. Optionally, first client device 20 regularly updates the first media file log data to server computer 10. In some implementations, the first media file log data are sent and updated to server computer 10 after receiving and loading the requested media data in accordance with the media content request.

In some implementations, client device 20 maintains a user interface (e.g., a tool menu) as a part of a web browser or a media player to control the above location based data delivery operations. In some embodiments, sending the media file access request further includes enabling a control option for location based media data delivery on the user interface of the web browser or the media player. In accordance with the enabled control option, the user interface included in the web browser allows first client device 20 to utilize the media file log data concerning the media files that are transmitted to second client devices 30 located nearby within a predetermined range.

In some implementations, the user of first client device 20 enables the control option via a designated action of the user, and the designated action includes, but is not limited to, a click on a mouse button, a slide on a touch pad, and the like. As a specific example, two options are set forth in the user interface of the web browser or the media player. One option is controlled to access first media file log data that are created and maintained locally by first client device 20, and the other option is controlled to access the media file log data for second client devices 30 that are currently or were previously located nearby within the predetermined range of a selected first geolocation. On the same user interface, the user of first client device 20 is allowed to define criteria to select the first geolocation and the predetermined range around first client device 20.

When the user of first client device 20 selects the option for accessing the first media file log data, the user may view a record of media files that have been loaded locally during a predetermined period of time. When the user of first client device 20 selects the other option for accessing the media file log data for second client device 30, first client device 20 executes programs to implement the aforementioned methods (e.g., methods 200 and 250), allowing the user to review a record of media files that have been loaded by second client devices 30.

In some implementations, in addition to such optional proactive reviewing of the media file log data for the first and second client devices, the user is also provided with an ordered list of media files, a selected media file, or a requested media file including customized content, and each reflects the media file log data provided by both the first and second client devices. Thus, such sharing of the media file log data among first and second client devices allows the scope of the delivered media file to be expanded based on viewing activities of their users who may share similar background and interests, such that the user of a client device may be provided with more relevant media content and enjoy improved user experience. More details on improving the user experiences based on location based data delivering are explained above with reference to FIGS. 1-3. For brevity, these details are not repeated here.

It should be understood that the particular order in which the operations in FIG. 4 have been described are merely exemplary and are not intended to indicate that the described order is the only order in which the operations could be performed. One of ordinary skill in the art would recognize various ways to receive location based data as described herein. Additionally, it should be noted that details of other processes described herein with respect to methods 200, 250, 300 and 500 (e.g., FIGS. 2A, 2B, 3 and 5) are also applicable in an analogous manner to method 400 described above with respect to FIG. 4. For brevity, these details are not repeated here.

Figure 5:
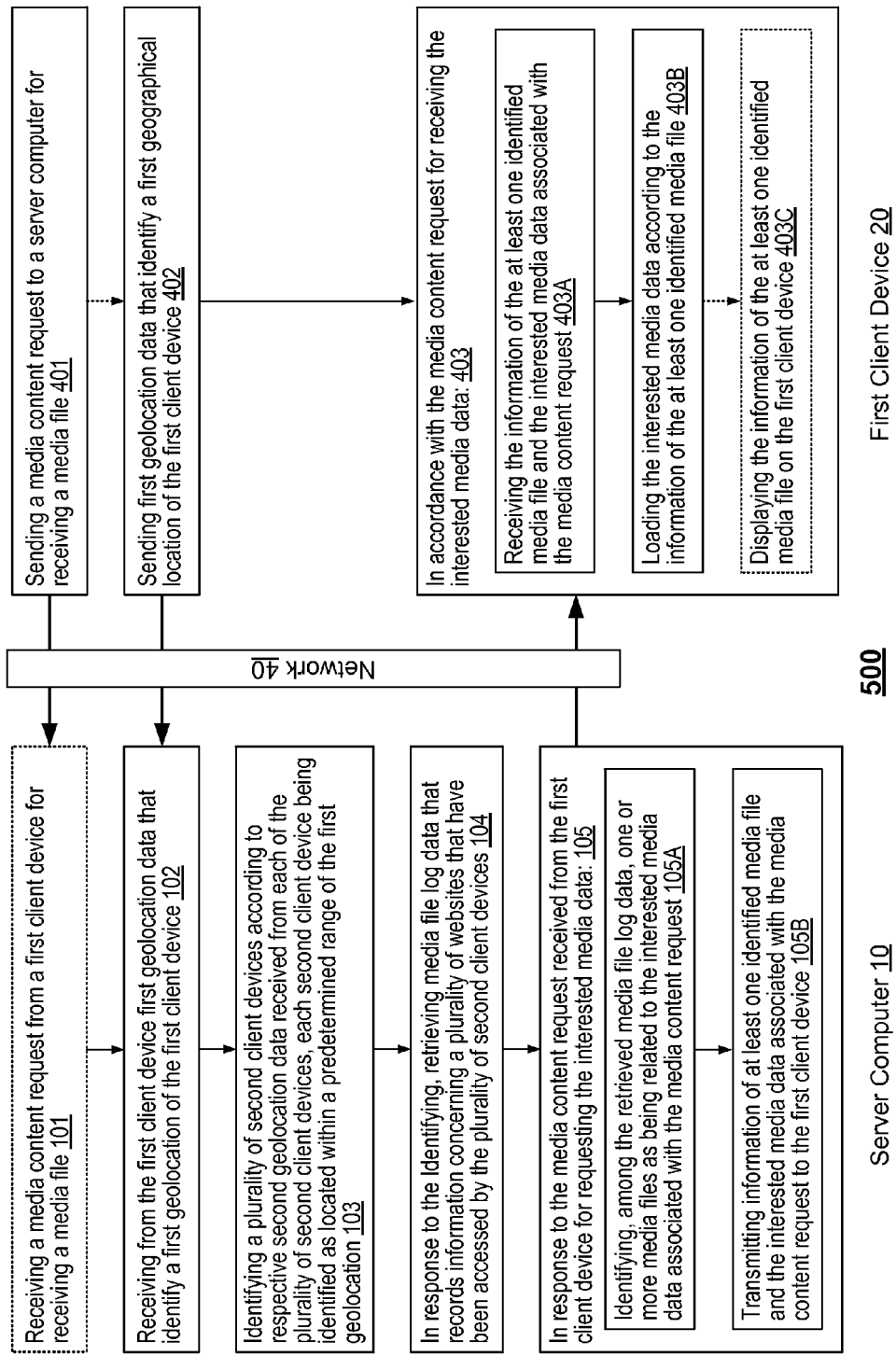
FIG. 5 illustrates a comprehensive flow chart for an exemplary location based media data delivery method that is implemented between a server computer and a client device to process a web access and corresponding location based data according to some embodiments in the invention.

FIG. 5 illustrates a comprehensive flow chart for an exemplary location based media data delivery method 500 that is implemented between a server computer and a client device to process a media content request and corresponding location based media data according to some embodiments in the invention. Method 500 optionally combines method 400 that is implemented at a client device (e.g., first client device 20) with one of methods 200, 250 and 300 that is implemented at a server computer (e.g., server computer 10). In some embodiments, method 500 allows first client device 20 to include in a requested media file customized content that is determined according to media files transmitted to one or more associated client devices. In some embodiments, method 500 selects and delivers a media file among a plurality of media files according to media files transmitted t one or more associated client devices, and in some embodiments, method 500 merely generates an ordered list of media files that is ordered according to the media files transmitted t one or more associated client devices.

In some implementations, first client device 20 sends (401) a media content request to request interested media data, and server computer then receives (101) the media content request. Likewise, first client device 20 sends (402)

first geolocation data that identify at least a first geolocation of first client device, and server computer then receives (102) the first geolocation data for identifying the first geolocation. Server computer 10 further identifies (103) a plurality of second client devices according to respective second geolocation data received from each of the plurality of second client devices. Each identified second client device 30 is identified as previously or current located within a predetermined range of the first geolocation of first client device 20. In response to the identifying (103), server computer 10 further retrieves (104) media file log data that records information concerning a plurality of media files that have been transmitted to second client devices 30.

Server computer 10 then responds (105) to the media content request received from first client device 20 by identifying (105A), among the retrieved media file log data, one or more media files as being related to the interested media data associated with the media content request; and transmitting (105B) information of at least one identified media file and the interested media data associated with the media content request to the first client device. On the other hand, in accordance with the media content request for accessing the media file, first client device 20 receives (403A) from server computer 10 the information of at least one identified media file and the interested media data associated with the media content request.

As explained above with reference to FIG. 1, the first geolocation data identify a current location or a plurality of previous locations where first client device 20 is or was located, respectively; the second geolocation data similarly identify a current location or a plurality of previous locations where second client devices 30 are or were located, respectively. Thus, the first geolocation is selected between the current location and a previous location of first client device 20.

In methods 200-500, second client devices 30 are determined according to the first geolocation and the predetermined range, and thereby identified under one of the following four situations: when they are presently located within the predetermined range of the current location of first client device 20, when they were previously located within the predetermined range of the current location of first client device 20, whey are currently located within the predetermined range of a previous location that first client device 20 once visited, and when they were previously located within the predetermined range of a previous location that first client device 20 once visited. Stated another way, first client device 20 and second client devices 30 share some common activity regions. In some implementations, first client device 20 incorporates a user interface on a web browser or a media player to allow the user to determine criteria of identifying second client devices 30, e.g., the predetermined range, the first geolocation and one of the four situations.

It should be understood that the particular order in which the operations in FIG. 2A have been described are merely exemplary and are not intended to indicate that the described order is the only order in which the operations could be performed. One of ordinary skill in the art would recognize various ways to deliver data and media file content as described herein. Additionally, it should be noted that details of other processes described herein with respect to methods 200, 250, 300 and 400 (e.g., FIGS. 2A, 2B, 3 and 4) are also applicable in an analogous manner to method 200 described above with respect to FIG. 5. For brevity, these details are not repeated here.

Figure 6:
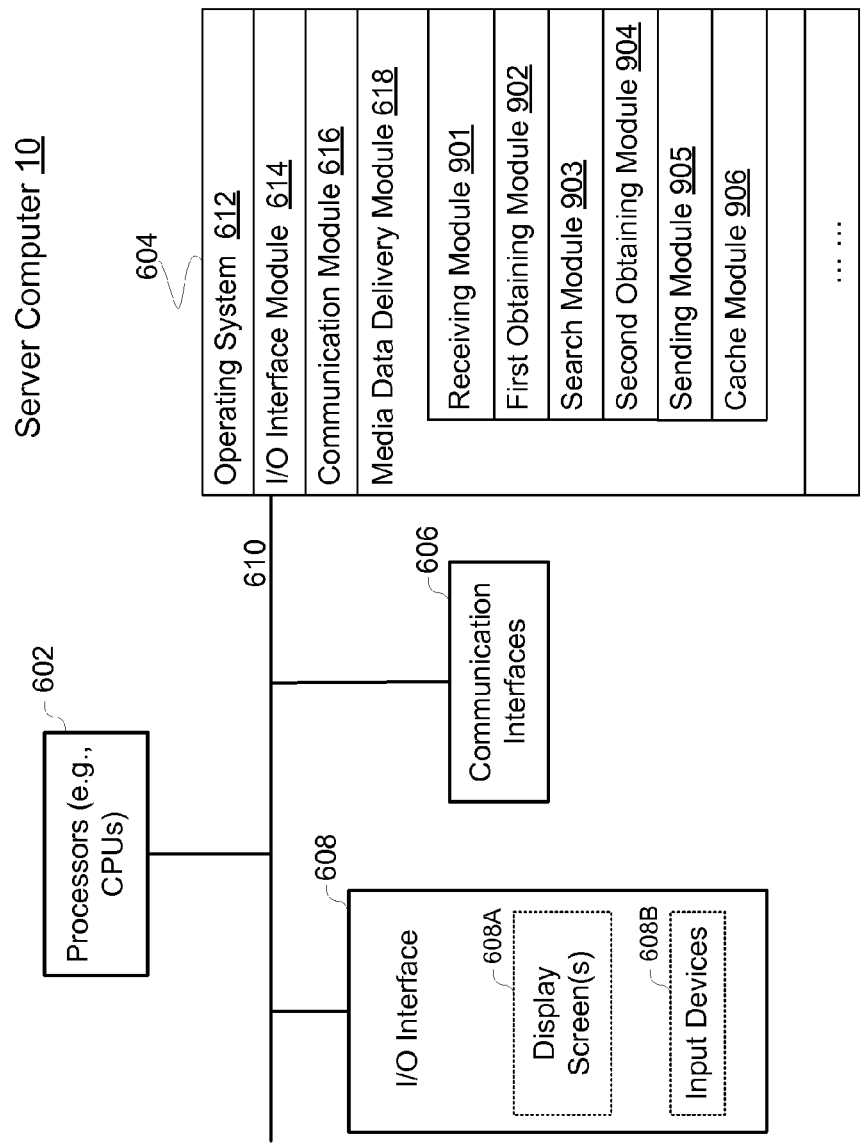
FIG. 6 illustrates a block diagram of an exemplary server computer that is used for managing location based media data delivery according to some embodiments in the invention.

FIG. 6 illustrates a block diagram of an exemplary server computer that is used for managing location based media data delivery according to some embodiments in the invention. In accordance with various embodiments of the invention, server computer 10 is applied to implement location based data delivery methods as shown in FIGS. 1-5. In some implementations, server computer 10 at least includes one or more processors 602 (e.g., central processing units) and a memory 604 for storing programs and instructions for execution by one or more processors 602. In some implementations, server computer 10 further includes one or more communications interfaces 606, a user interface 608, and one or more communications buses 610 that interconnect these components.

In some embodiments, input/output (I/O) interface 608 includes a display 608A and input devices 608B such as a keyboard, a mouse or a track-pad. In some embodiments, communication buses 610 include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604 includes one or more storage devices remotely located from the one or more processors 602. In some embodiments, memory 604, or alternatively the non-volatile memory device(s) within memory 604, includes a non-transitory computer readable storage medium.

In some embodiments, memory 604 or alternatively the non-transitory computer readable storage medium of memory 604 stores the following programs, modules and data structures, instructions, or a subset thereof:

Operating System 612 that includes procedures for handling various basic system services and for performing hardware dependent tasks;

I/O interface module 614 that includes procedures for handling various basic input and output functions through one or more input and output devices;

Communication module 616 that is used for connecting server computer 10 to other server computer 10 or client devices 20, via one or more network communication interfaces 606 (wired or wireless) and one or more communication networks, such as the Internet, other wide area networks, local area networks, metropolitan area networks, and so on; and Media file delivery module 618 that responds to a media content request received from first client device 20 by providing interested media data together with information of at least one media file transmitted to other related client devices, or by providing the interested media data (e.g., a media file) that already incorporates content customized based on the information of the at least one media file.

In some implementations, media file delivering module 618 in memory 604 further includes:
receiving module 901 that receives the media content request sent by first client device 20;
first obtaining module 902 that obtains first geolocation data for identifying a first geolocation of first client device 20, wherein the first geolocation data are collected by the LBS function supported by first client device 20 or by an IP address lookup done by server computer 10;

search module 903 that identifies a plurality of second client devices 30 previously or currently located within a predetermined range of the first geolocation of first client device 20, in accordance with first geolocation data and respective geolocation data received from each of the plurality of second client device;

second obtaining module 904 that obtains and stores media file log data that records information concerning a plurality of media files that have been transmitted to the plurality of second client devices 30;

sending module 905 that identifies among the media file log data one or more media files as being related to a requested media file, and transmits information of at least one identified media file and the interested media data associated with the media content request to first client device 20; and cache module 906 that manages and handles storing of the respective geolocation data and the respective media file log data for the first and second client devices.

As explained above with reference to FIGS. 1-5, in some implementations, server computer 10 regularly receives updates of the geolocation data and the media file log data for both the first and second client devices. These data are optionally updated upon receiving a media content request from a client device. As such, the latest geolocation data are regarded as indicating the current geolocation of the corresponding client device, even though the client device might have moved to a distinct location since the last update. In general, second client devices 30 are determined when they have previously visited or are currently located within the predetermined range of a reference geolocation (e.g., the first geolocation) that first client device 20 previously visited or is currently located at, and such determination is independent of whether the first and second client devices have even contemporaneously stayed nearby the same geolocation. For brevity, details concerning identifying second client devices based on the first and second geolocation data are not repeated here.

Figure 7:
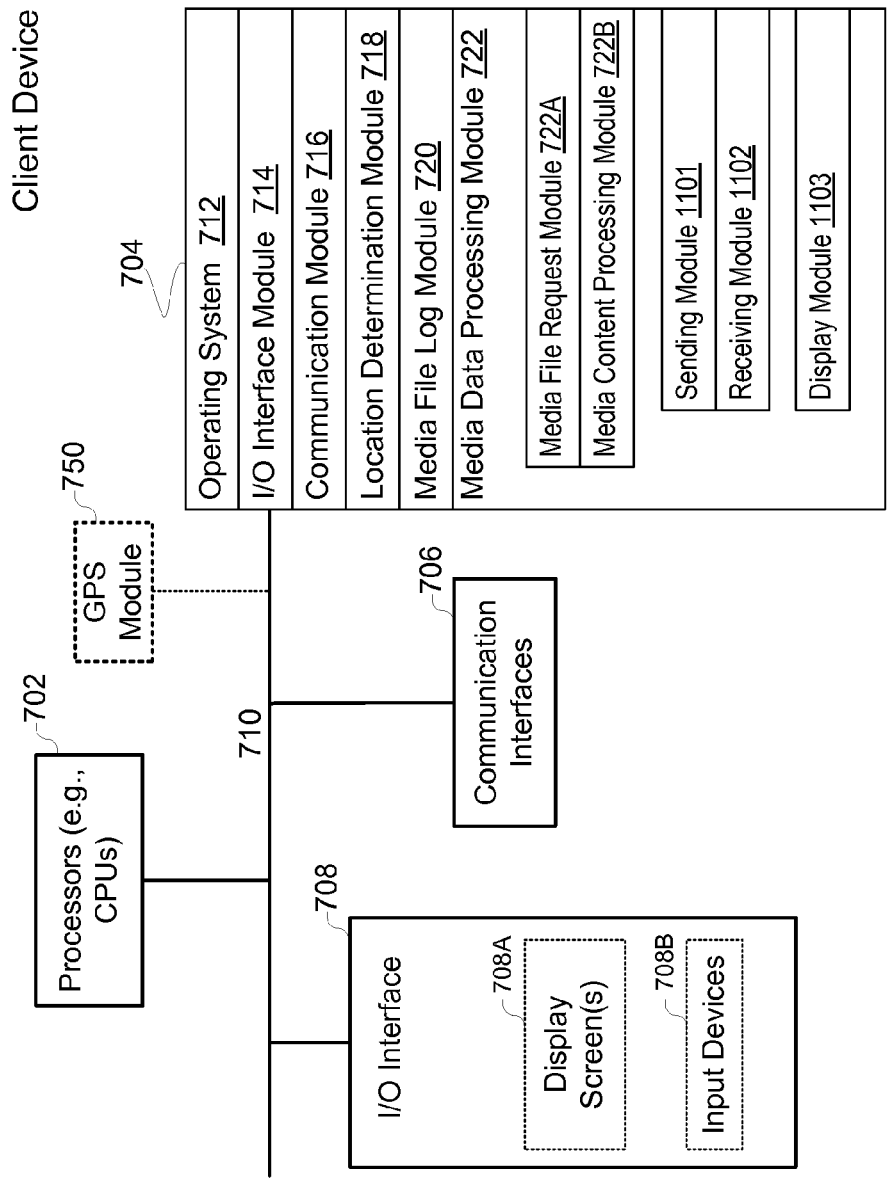
FIG. 7 illustrates a block diagram of an exemplary client device that is used for handling location based media data delivery according to some embodiments in the invention.

FIG. 7 illustrates a block diagram of an exemplary client device 700 that is used for handling location based media data delivery according to some embodiments in the invention. In accordance with various embodiments of the invention, client 700 optionally represents each of first client device 20 or second client devices 30 that are applied to implement location based data delivering methods as shown in FIGS. 1-5. In some implementations, client device 700 at least includes one or more processors 702 (e.g., central processing units) and a memory 704 for storing programs and instructions for execution by one or more processors 702. In some implementations, client device 700 further includes one or more communications interfaces 706, a user interface 708, and one or more communications buses 710 that interconnect these components.

In some embodiments, I/O interface 708 includes a display 708A and input devices 708B such as a keyboard, a mouse or a track-pad. In some embodiments, communication buses 710 include circuitry (sometimes called a chipset) that interconnects and controls communications between system components. In some embodiments, memory 704 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 704 includes one or more storage devices remotely located from the one or more processors 702. In some embodiments, memory 704, or alternatively the non-volatile memory device(s) within memory 704, includes a non-transitory computer readable storage medium.

In some embodiments, memory 704 or alternatively the non-transitory computer readable storage medium of memory 704 stores the following programs, modules and data structures, instructions, or a subset thereof:

Operating System 712 that includes procedures for handling various basic system services and for performing hardware dependent tasks;

I/O interface module 714 that includes procedures for handling various basic input and output functions through one or more input and output devices;

Communication module 716 that is used for connecting client device 700 to server computer 10 or other client devices, via one or more network communication interfaces 706 (wired or wireless) and one or more communication networks, such as the Internet, other wide area networks, local area networks, metropolitan area networks, and so on;

LBS module 718 that generates geolocation data for identifying a geolocation for client device 700, wherein the geolocation optionally includes a current location where client device 700 is currently located or a previous location where client device 700 was previously located;

Media file log module 720 that generates first media file log data for tracking a plurality of media files transmitted to client device 700; and Media file processing module 722 that issues a media content request, receives and processes the interested media data returned from server computer 10, and presents the received or processed media data to a user of client device 700, wherein in some implementations, media file processing module 722 in first client device 20 optionally receives information of media files associated with second client devices 30 and processes the interested media data accordingly.

In some implementations which involves first client device 20, media data processing module 722 in memory 704 further includes:

sending module 1101 that sends a media content request to server computer 10 and the first geolocation data of first client device 20 to server computer 10; and receiving module 1102 that receives information of at least one identified media file in the media file log data of second client devices 30 and the interested media data associated with the media content request, or receives the interested media data (e.g., a specific requested media file) that already include content customized according to the media file log data of second client devices 30;

a display module 1103 that displays to the user of first client device 20 information of at least one identified media file in the media file log data of second client devices 30;

a media content request module 722A that generates the media content request to request the interested media data, and allows the user to adjust control options on a user interface of a web browser (or a media player) and enable delivering of location based media data; and a media content processing module 722B that locally processes the interested media data according to the received information of the at least one identified media file in the media file log data of second client devices 30.

In some implementations, first client device 20 further includes a user interface in a web browser or a media player to present the interested media data for the user of first client device 20. The user determines via the user interface one or more settings in a setting group that consists of a respective duration of time for which the geolocation data and the media file log data are maintained, a respective frequency for which such data are updated with server computer 10, a control option that enables or disables the corresponding location based data delivering function, first criteria for selecting a reference geolocation (e.g., the first geolocation) based on the first media file log data, a predetermined range with respect to the reference geolocation for identifying second client devices 30, and second criteria for selecting second client devices 30 that are currently or were previously located near the reference location. More details for each setting in the setting group are explained above with reference to FIGS. 1-5. For brevity, these details are not repeated here.

Similarly, in some implementations, each second client device 30 also includes a respective user interface that allows a user to determine via the user interface one or more settings in a web browser. The corresponding setting group optionally includes a duration of time for which the media file log data are maintained and a frequency for which such data are updated with server computer 10. However, the other settings associated with location based media data delivery are optionally included in accordance with whether such a function is supported by the web browser of respective second client device 30.

In summary, a location based media data delivery method (e.g., methods 200, 250, 300, 400 and 500) allows client device 700 to obtain the interested media data that are customized according to media files browsed on other client devices (previously or currently located within the predetermined range of the reference location). Such an implementation is based on an assumption that users of client devices share at least some behaviors, habits, interests or tastes when their physical activity space overlaps in their actual life. Given such an assumption, the requested media file is customized to predict demands of the users of the client devices according to the media files transmitted to other related users, such that a more relevant list of media files or a media file with more relevant content is offered to improve their user experience.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A location-based media data delivery method, comprising:
   at a server computer having one or more processors and memory for storing programs to be executed by the one or more processors:
   receiving, from a first client device, first geolocation data that identify a first geolocation of the first client device;
   identifying a plurality of second client devices, according to respective second geolocation data received from each of the plurality of second client devices identifying a respective second geolocation of the respective second client device, that are currently located within a predetermined range of the first geolocation;
   in response to the identifying, retrieving media file log data that record information concerning a plurality of media files that have been transmitted to the plurality of second client devices while they are located within the predetermined range of the first geolocation in response to a plurality of media content requests from the second client devices; and
   in response to a media content request received from the first client device to request interested media data:
   identifying, among the retrieved media file log data, one or more media files of the plurality of media files as being related to the interested media data requested by the media content request; and transmitting, to the first client device, information of at least one of the one or more identified media files and the interested media data requested by the media content request, wherein the interested media data is customized according to viewing habits of corresponding users of the plurality of second client devices, and the viewing habits are derived from information of the one or more identified media files.

2. The method of claim 1, wherein at least a portion of the information of the at least one of the identified media files and the interested media data transmitted to the first client device is selected from a set of advertisement clips.

3. The method of claim 1, wherein the interested media data requested by the media content request comprise an ordered list of media files that are arranged according to the information of the at least one identified media file in the media file log data.

4. The method of claim 1, wherein the media file log data for the plurality of second client devices were previously stored in the memory of the server computer, when the server computer received respective media content requests issued by the plurality of second client devices.

5. The method of claim 1, wherein first media file log data are received from the first client device when the first geolocation data are received from the first client device, such that the first media file log data may be transmitted to and used by another client device.

6. The method of claim 1, wherein the respective geolocation data received from each of the first client device and the plurality of second client devices further comprise current geolocation data that identify where the respective client device is currently located, and historical geolocation data that identify where the respective client device was previously located during a predetermined duration of time.

7. The method of claim 1, wherein the media file log data for the plurality of second client devices include information concerning media sources and content of the plurality of media files that have been transmitted to the plurality of second client devices during a predetermined duration of time.

8. The method of claim 1, wherein the predetermined range of the first client device substantially covers a venue where the user of the first client device is currently located, and the venue is selected from a group consisting of a school, a store, a company site, a library, a hotel and a residence.

9. The method of claim 1, wherein a media file associated with the interested media data is selected from a static image, a video clip, an audio clip and a live broadcast.

10. The method of claim 1, wherein a user of the first client device enables and disables the method for location-based media data delivery by controlling an option on a user interface of the first client device.

11. The method of claim 10, wherein the user interface further includes controls for one or more settings in a setting group that consists of a respective duration of time for which the first geolocation data and a first media file log data are maintained, a respective frequency for which such data are updated with the server computer, first criteria for selecting the first geolocation based on the first media file log data, the predetermined range with respect to the first geolocation for identifying the plurality of second client devices, and second criteria for selecting the plurality of second client devices that are currently located within the predetermined range of the first geolocation.

12. A server computer, comprising:
one or more processors; and
memory having instructions stored thereon, which when executed by the one or more processors cause the processors to perform operations, comprising:
receiving, from a first client device, first geolocation data that identify a first geolocation of the first client device;
identifying a plurality of second client devices, according to respective second geolocation data received from each of the plurality of second client devices identifying a respective second geolocation of the respective second client device, that are currently located within a predetermined range of the first geolocation;
in response to the identifying, retrieving media file log data that record information concerning a plurality of media files that have been transmitted to the plurality of second client devices while they are located within the predetermined range of the first geolocation in response to a plurality of media content requests from the second client devices; and
in response to a media content request received from the first client device to request interested media data:
identifying, among the retrieved media file log data, one or more media files of the plurality of media files as being related to the interested media data requested by the media content request; and
transmitting, to the first client device, information of at least one of the one or more identified media files and the interested media data requested by the media content request, wherein the interested media data is customized according to viewing habits of corresponding users of the plurality of second client devices, and the viewing habits are derived from information of the one or more identified media files.

13. The server computer of claim 12, wherein at least a portion of the customized media file transmitted to the first client device is selected from a set of advertisement clips.

14. A location-based media data delivery method, comprising:
at a server computer having one or more processors and memory for storing programs to be executed by the one or more processors:
receiving from a first client device first geolocation data that identify a first geolocation of the first client device;
identifying a plurality of second client devices according to respective geolocation data received from each of the plurality of second client devices identifying a respective second geolocation of the respective second client device, that are currently located within a predetermined range of the first geolocation;
in response to the identifying, retrieving media file log data that record information concerning a plurality of media files that have been transmitted to the plurality of second client devices while they are located within the predetermined range of the first geolocation in response to a plurality of media content requests from the second client devices;
customizing content of a specific media file according to viewing habits of corresponding users of the plurality of second client devices, wherein the viewing habits are derived from one or more media files that are related to the specific media file and included in the retrieved media file log data; and
in response to a media content request received from the first client device for receiving the specific media file, transmitting the specific media file that includes the customized content to the first client device and information of one or more media files identified, among the retrieved media file log data, as being related to the specific media file.

15. The method of claim 14, wherein the predetermined range of the first client device substantially covers a venue where the user of the first client device is currently located, and the venue is selected from a group consisting of a school, a store, a company site, and a residence.

16. The method of claim 14, wherein the media file log data for the plurality of second client devices were previously stored in the memory of the server computer, when the server computer received respective media content requests issued by the plurality of second client devices.

17. The method of claim 14, wherein the respective geolocation data received from each of the first client device and the plurality of second client devices further comprise current geolocation data that identify where the respective client device is currently located, and historical geolocation data that identify where the respective client device was previously located during a predetermined duration of time.

18. The method of claim 14, wherein the media file log data for the plurality of second client devices include sources and content of the plurality of media files that have been transmitted to the plurality of second client devices during a predetermined duration of time.

\* \* \* \* \*